United States Patent [19]
Terhune

[11] 3,818,741

[45] June 25, 1974

[54] POWER TRANSMISSION BELT AND METHOD OF MAKING

[75] Inventor: Hugh D. Terhune, Dover, N.J.

[73] Assignee: The Goodyear Tire and Rubber Company, Akron, Ohio

[22] Filed: Nov. 16, 1972

[21] Appl. No.: 307,025

[52] U.S. Cl............... 74/233, 161/59, 161/121, 161/123
[51] Int. Cl....... F16g 5/16, B22b 5/12, B32b 63/00
[58] Field of Search................ 161/59, 121, 123; 74/231 P, 232, 233, 234

[56] References Cited
UNITED STATES PATENTS

| | | |
|---|---|---|
| 2,620,016 | 12/1952 | Adams, Jr.................. 74/233 X |
| 2,728,239 | 12/1955 | Adams, Jr.................. 74/233 X |
| 2,850,420 | 9/1958 | Hacker..................... 74/232 X |
| 3,348,422 | 10/1967 | Richmond.................... 74/233 |

Primary Examiner—Leonard H. Gerin
Attorney, Agent, or Firm—F. W. Brunner; R. H. Hatton

[57] ABSTRACT

A power transmission belt and method of making the same of the type having longitudinal ribs that run in grooved pulleys which comprises a tension carrying section and a compression section, characterized by having a sheet member made up of one or more plies selected from a woven fabric, a rubberized bias fabric, a fabric composed of a fiber reinforced film of rubber and the like, hung in a catenary suspension within the compression section of the belt.

12 Claims, 6 Drawing Figures

POWER TRANSMISSION BELT AND METHOD OF MAKING

The invention relates to a vulcanized power transmission belt and a method of making the same.

The invention pertains more particularly to power transmission belts of the family that have longitudinal ribs that run in grooved pulleys. The ribs are approximately triangular or trapezoidal in shape and run in V-shaped grooves in the pulley. In such belts, the tension and load-carrying section is above the pulley grooves for the full width of the pulley face. This is in contrast to so-called V-belts in which the tension and load-carrying section lies within the individual pulley grooves.

The essence of the present invention is the inclusion of one or more plies of a sheet member, which is relatively inextensible compared to flowing rubber, hung as a catenary suspension or "hammock" in the compression or ribbed section of the mold with the object of more effectively supporting the tension or load-carrying section above it.

A further object of the invention pertains to a second function of the catenary suspended sheet member acting as a "crack arrester," particularly needed when a power transmission belt is used in reverse bend, cracking deep enough to cause the belt to break. Bias fabric covers, all the way around or at the bottom of the belt rib, have served to postpone belt failures due to cracks. The thicker the belt is, in relation to the pulley diameter, the sooner the belt will crack. In carrying out this second object of the invention, the catenary suspended or "hammock" ply or plies of the sheet member are located so that they are intermediate within the belt and form a longer lasting crack barrier at a shallower position of the belt.

To accomplish these objects of the invention, the present invention relates more particularly to a vulcanized power transmission belt and a method of making the same which is more particularly defined in the appended claims, taken together with the following description and shown in the accompanying drawings, in which:

Figure 1:
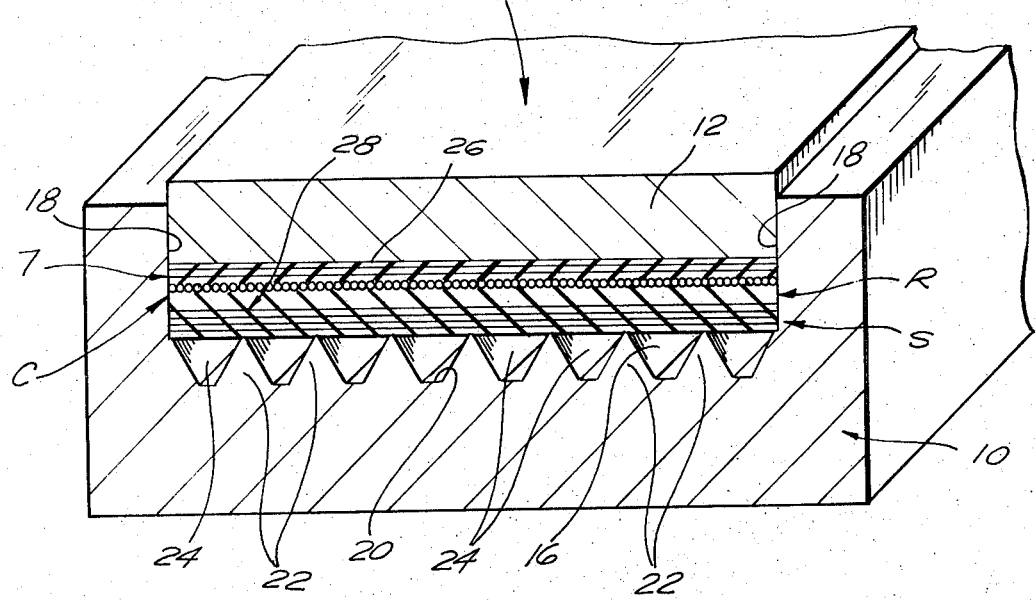
FIG. 1 is a perspective view showing in cross-section a mold and the assembly of the parts of the vulcanized belt body or carcass in the first step of molding the same.
Figure 3:
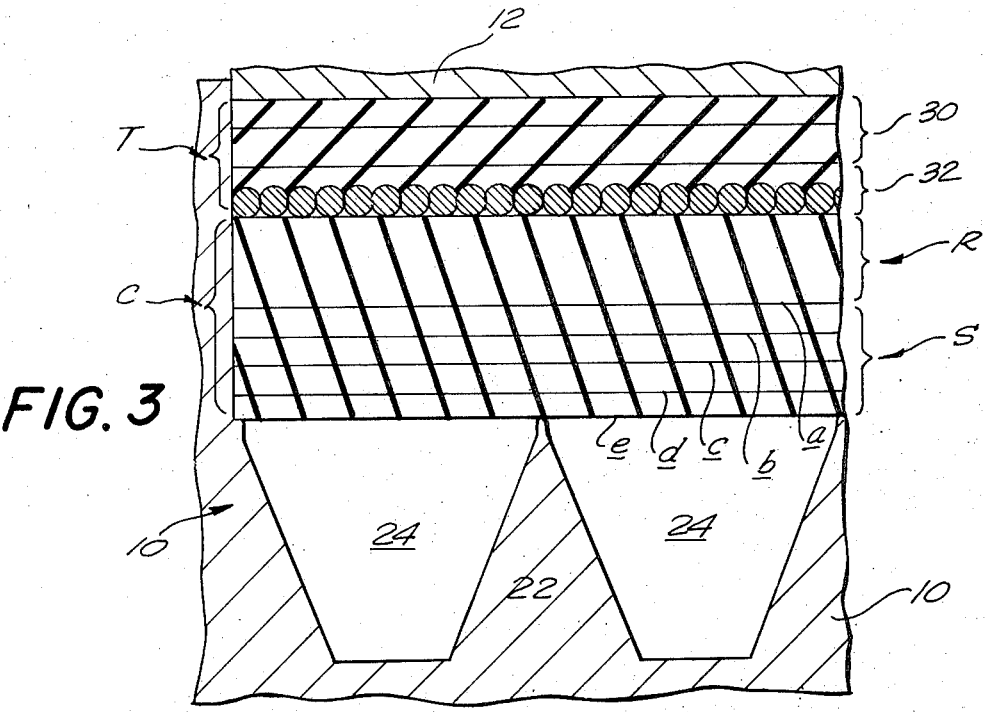
FIGS. 3 to 5 are views, drawn to an enlarged scale with reference to FIG. 1 of the drawings and depicting the parts of the belt body in a more diagrammatic form (compared with FIG. 2) and showing.
Figure 4:
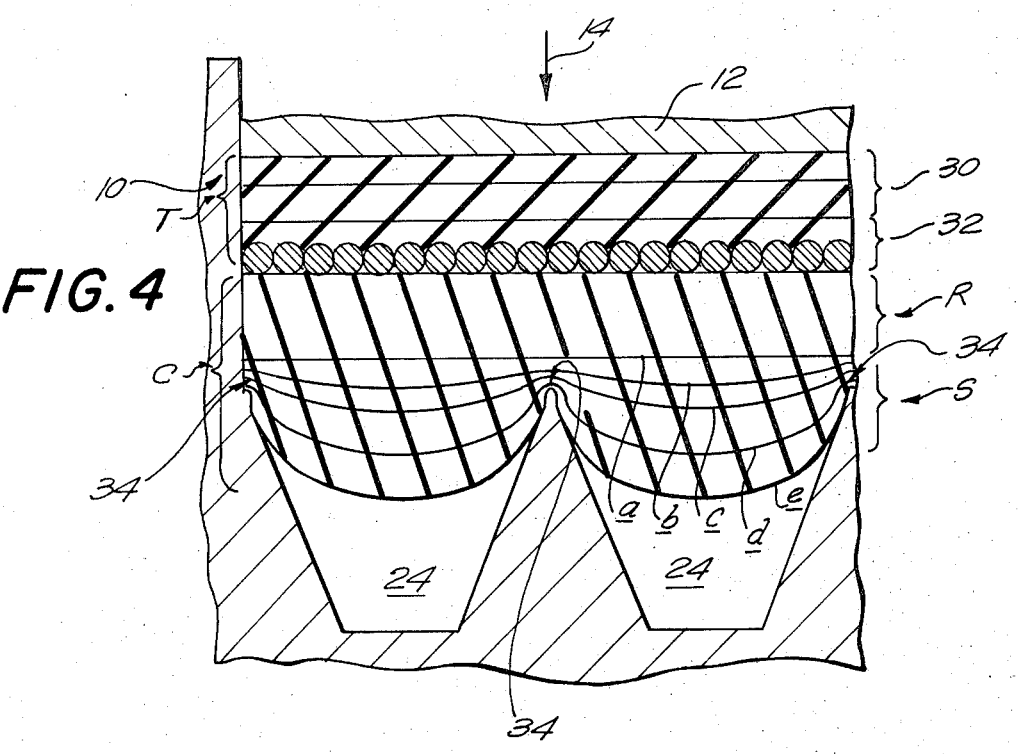
Figure 5:
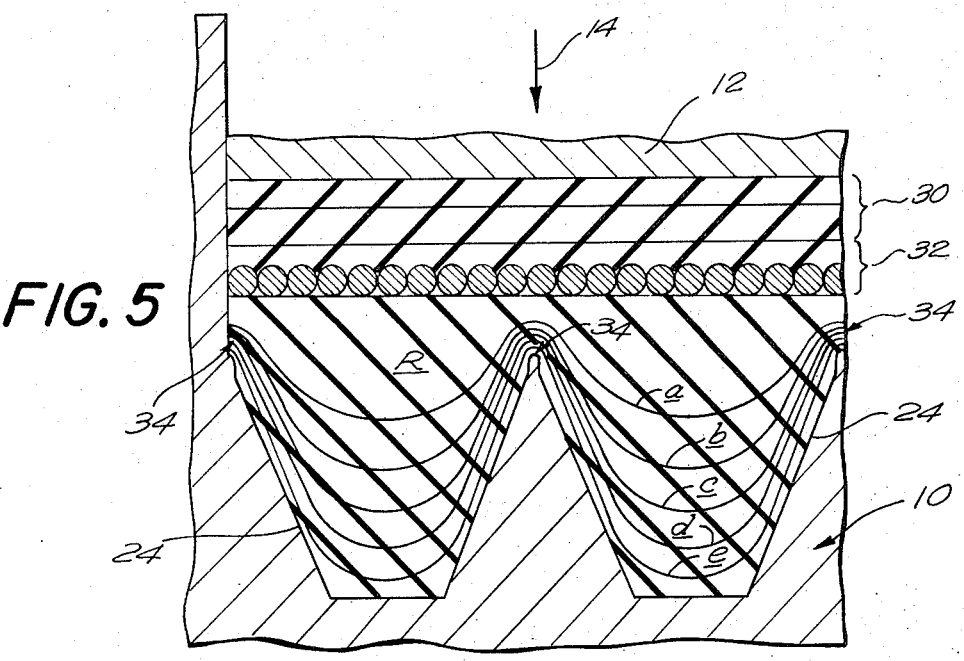
Figure 6:
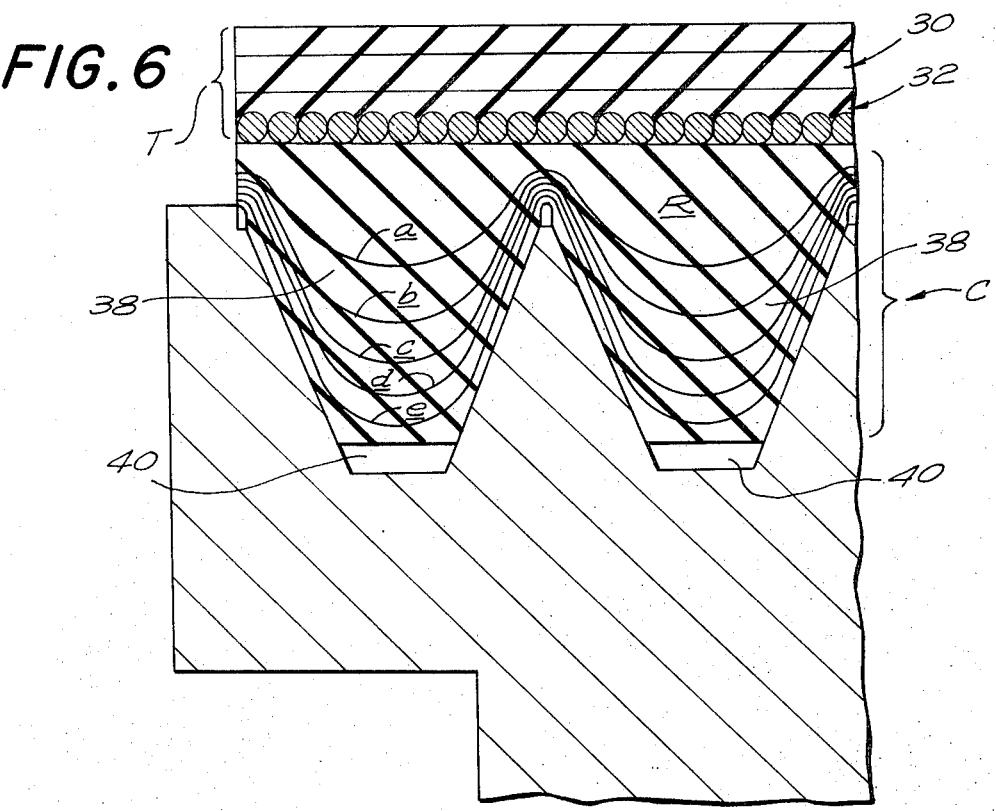

In FIG. 3, the initial molding step depicted in FIG. 1;

In FIG. 4, the action that takes place in the initial stages of forcing the belt body or carcass into the mold;

In FIG. 5, the action that takes place in the final stage of the molding step; and FIG. 6 is a view taken in cross-section depicting the use of the completed belt in its travel about a ribbed pulley.

Referring now more in detail to the drawings and having reference first to FIG. 1 thereof, the mold comprises a lower mold member 10 and an upper mold member 12, the upper member being moved under pressure as indicated by the arrow 14 toward (and away from) the lower member. The lower mold member 10 is provided with a cavity 16 defined by walls 18 and a bottom 20, the latter having a plurality of ribs 22 alternately spaced with grooves 24. The upper mold member 12 has a planar lower face 26 which is adapted to bear upon the non-working face of a belt carcass generally designated as 28 adapted to be disposed in the cavity of the mold. Conventional pressure means (not shown) is employed to urge the upper mold member toward the lower mold member to compress the belt carcass, and conventional heating means may be employed to heat and cure the belt carcass during the molding operation.

Figure 2:
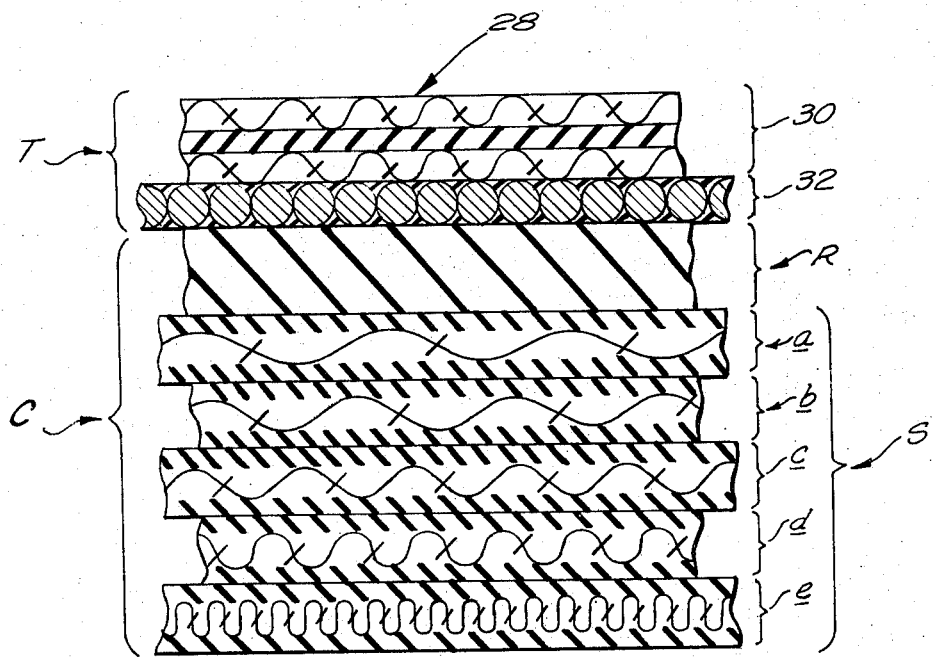
FIG. 2 is a view drawn to a magnified scale, showing the parts which make up the belt body or carcass as prepared for the molding step.

The belt carcass 28 of the present invention is shown in detail in FIG. 2 of the drawings (and in a more generalized or diagrammatic form in the remaining figures of the drawings) the same comprising, (as best shown in FIG. 2) a tension forming section T and a compression forming section C, the latter comprising a rubber sheet body R and at least one ply of an underlying sheet member S, a plurality of such plies being preferred. The tension forming section T comprises more specifically a backing composed of one or more rubberized fabric sheets generally designated as 30 and a rubberized or adhesive coated cord or the like generally designated as 32, the latter comprising the strength member of the completed belt. As is well known, such a strength member preferably consists of a plurality of cords as shown laid parallel to each other and parallel to the length of the belt, the parallel strength members being disposed in one or more layers substantially parallel to the plane of the rubberized sheets 30.

The carcass or body 28 is built-up as a sleeve and contains the rubberized fabric 30 on the back, the adhesive coated cord strength member 32, the rubber sheet R (usually referred to as the gum sheet) and the one or more plies of the sheet member S. The sheet member S exemplified in the drawings comprises one or more plies (5 such plies being shown in the drawings) of a material selected from woven fabric, a rubberized bias fabric and a fabric composed of a fiber reinforced film of rubber, these being indicated by the reference characters $a$, $b$, $c$, $d$ and $e$.

The fabric or film of the plies $a$ to $e$ of the sheet member S is selected to have an ultimate elongation in the range of 50 to 150 percent in the transverse direction (FIG. 2). This elongation may be achieved by pleating, sanforizing, texturizing, crimping or twisting of the yarns in the fabric weave and by a selection of fiber according to the modulus or degree of stretch inherent in the material. The plies of the fabric of the sheet member S are selected with suitable openness to let the fabric leak rubber through the weave with more or less force or stretch on the fabric. A tightly woven high thread count fabric will not easily leak rubber and be carried further by the rubber movement in the making of the belt. As clearly indicated in the illustration of FIG. 2 of the drawings, the closer woven fabric ply is placed nearest to the mold cavities where the movement desired is greatest.

The assembled or built-up cylindrical sleeve laminate carcass or body 28 is placed in the hot mold 10 under pressure. The outer flat surface of the laminate is forced into the mold grooves or cavities 24 having any desired approximate triangular, trapezoidal or other cross-sectional profile. Upon operation of the mold, flow of the rubber (or generally gum) material into the mold grooves 24 carries with it the fabric plies of the sheet member S to form a catenary suspension bridge or "hammock" intermediate between the top and bottom of the mold grooves 24. This is illustrated in the sequential views of FIGS. 3 to 5 of the drawings. As the pressure on the semi-fluid gum or rubber is applied, the rubber is forced to flow away from the places of highest pressure indicated by the reference characters 34 in FIG. 4. At these places, the fabric plies a to e are forced closer together; and away from these places of highest pressure, the fabric plies are spread further apart by the new rubber forced between them. The result is that a plurality of mutually spaced catenary suspensions of these plies a to e are produced within the compression section of the belt as is progressively indicated in FIGS. 4 and 5 of the drawings. The general movement of the rubber and fabric in this progression is toward the still empty portions of the mold cavities. Due to the resistance of the fabric to the passage of the fluid rubber through the weave, the fabric plies are not only spread further apart as depicted in the drawings, but the fabric of these plies is also carried along with the rubber movement with enough force to stretch the fabric towards the still empty parts of the mold cavities to form the catenary suspension or "hammock" referred to.

Where one of the plies of the sheet member S is composed of a fiber reinforced film of rubber or where the rubber sheet R is itself composed of staple fibers mixed in the rubber ply itself, the fibers are oriented in the direction that the rubber sheet comes out of the sheeting calendar. This rubber or gum sheet is cut into squares and placed in the belt carcass so that the fibers are crosswise of the belt. These oriented fiber-filled rubber sheet plies offer less resistance to stretch than a woven fabric — but more resistance than a rubber sheet without fiber. The "stretch" of the fiber filled rubber sheet ply, during molding from a flat to a ribbed surface as described is mostly a sliding of the fibers past each other in the viscous rubber or sticky gum fluid under pressure toward the empty portions of the mold.

In any of the referred to cases of the sheet member, namely, the woven fabric, the rubberized bias fabric and the fabric composed of a fiber reinforced film or sheet of rubber, the rubber is vulcanized during the molding; and vulcanization locks up the fabric weave or the fibers of the sheet member.

In FIG. 6 of the drawings, there is shown the completed vulcanized belt of the present invention as it travels over a pulley 36. In this illustration, the ribs 38 of the belt body are shown as trapezoidal in shape and these run in trapezoidal shaped grooves 40 in the pulley. It will be noted that the tension bearing portion T of the completed belt is above the pulley grooves for the full width of the pulley face. The formed compression section C, containing within the body thereof the suspended plies a to e of the sheet member, is thus constructed to effectively support the load-carrying member above it and functions as an efficient crack arrester.

The method of making a power transmission belt out of the present invention and the structural and functional characters of the resulting power transmission belt will, it is believed, be fully apparent from the above detailed description of both the method and the resulting belt product. It will be further apparent that many changes will be made in the build up of the belt carcass or body, the subjecting of the same to the steps of the process and the structure of the resulting transmission belt without departing from the spirit of the invention defined in the following claims.

I claim:

1. The method of making a flexible power transmission belt which comprises disposing in contact with a ribbed mold an unvulcanized belt body comprising a tension forming section, a rubber sheet and at least one ply of an underlying sheet member selected from a woven fabric, a rubberized bias fabric and a fabric composed of a fiber reinforced film of rubber, pressing said body under pressure against said ribbed mold to form a ribbed section on said body, said ribbed section defining the compression section of the belt, the rubber of the rubber sheet being flowed onto and through said underlying sheet member to form a catenary suspension of the same within the compression section of the belt, and vulcanizing the thus formed belt.

2. The method of claim 1, in which the underlying sheet member is composed of a plurality of said plies, producing a plurality of mutually spaced catenary suspensions of said plies within the compression section of the belt.

3. The method of claim 1, in which the tension forming section of the belt body comprises a rubberized fabric back and an adhesive coated cord or the like.

4. The method of claim 1, in which fabric or film of the underlying sheet member has an ultimate elongation in the range of 50 to 150 percent in the transverse direction.

5. The method of claim 1, in which the ply of the underlying sheet member has openness to permit the fabric thereof to leak the rubber through the same producing a stretch on the fabric.

6. The method of claim 2, in which the said plurality of plies have different fabric weaves the closer woven fabric plies being placed nearest the mold cavities of the ribbed mold.

7. The method of claim 1, in which when a ply comprises a fiber reinforced film of rubber, the fibers are oriented crosswise of the belt body.

8. A vulcanized flexible power transmission belt body comprising a tension section and a compression section, the compression section comprising a ribbed belt section, the ribs of which are adapted to run in the grooves of a ribbed pulley, the said compression section being formed with a sheet member hung in a catenary suspension within the compression section of the belt.

9. The power transmission belt of claim 8, in which the sheet member is composed of a plurality of plies, the compression section of the belt being formed with a plurality of mutually spaced catenary suspensions of said plies within said section.

10. The power transmission belt of claim 8, in which the tension section of the belt body comprises a rubberized fabric back and an adhesive coated cord or the like.

11. The power transmission belt of claim 9, in which the plurality of plies have different fabric weaves, the closer woven fabric plies being nearer the terminal parts of the formed ribs of the belt.

12. The power transmission belt of claim 8, in which the sheet member comprises a fiber reinforced film of rubber, the fibers of which are oriented crosswise of the belt body.

* * * * *